US011726328B2

(12) United States Patent
Zannoli et al.

(10) Patent No.: US 11,726,328 B2
(45) Date of Patent: Aug. 15, 2023

(54) ACCOMMODATION ADJUSTABLE AND MAGNIFICATION CORRECTIVE OPTICAL SYSTEM

(71) Applicant: Meta Platforms Technologies, LLC, Menlo Park, CA (US)

(72) Inventors: Marina Zannoli, Bloomington, IN (US); Jacques Gollier, Sammamish, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 321 days.

(21) Appl. No.: 17/112,342

(22) Filed: Dec. 4, 2020

(65) Prior Publication Data

US 2021/0223551 A1 Jul. 22, 2021

Related U.S. Application Data

(60) Provisional application No. 62/962,579, filed on Jan. 17, 2020.

(51) Int. Cl.
  *G02B 27/01* (2006.01)
  *G02B 3/14* (2006.01)
(52) U.S. Cl.
  CPC ........... *G02B 27/0172* (2013.01); *G02B 3/14* (2013.01); *G02B 2027/011* (2013.01)
(58) Field of Classification Search
  None
  See application file for complete search history.

(56) References Cited

U.S. PATENT DOCUMENTS 10,248,001 B1 * 4/2019 Lu ............................. G02B 3/14
10,319,154 B1   6/2019 Chakravarthula et al.
2016/0189432 A1 6/2016 Bar-zeev et al.
2019/0346918 A1* 11/2019 Akkaya ............. G02B 27/0075

FOREIGN PATENT DOCUMENTS

WO   2019/141990 A1   7/2019

OTHER PUBLICATIONS

International Preliminary Report on Patentability for International Application No. PCT/US2021/012002, dated Jul. 28, 2022, 9 pages.
International Search Report and Written Opinion of International Application No. PCT/US2021/012002, dated Apr. 9, 2021, 13 pp.

* cited by examiner

*Primary Examiner* — Bao-Luan Q Le
*Assistant Examiner* — Danell L Owens
(74) *Attorney, Agent, or Firm* — Shumaker & Sieffert, P.A.

(57) ABSTRACT

The disclosure describes artificial reality (AR) systems and techniques that enable a change in focus of virtual image content without substantially changing magnification of real-world content. For example, an AR system includes a virtual image content output device, a first tunable lens on a real-world side of the virtual image content output device, a second tunable lens on an eye side of the virtual image content output device, and at least one compensating lens. The at least one compensating lens is configured to substantially eliminate magnification changes of real-world light between a real-world end of the optical system and an eye-side end of the optical system as a focal power of at least one of the first tunable lens or the second tunable lens changes.

21 Claims, 13 Drawing Sheets

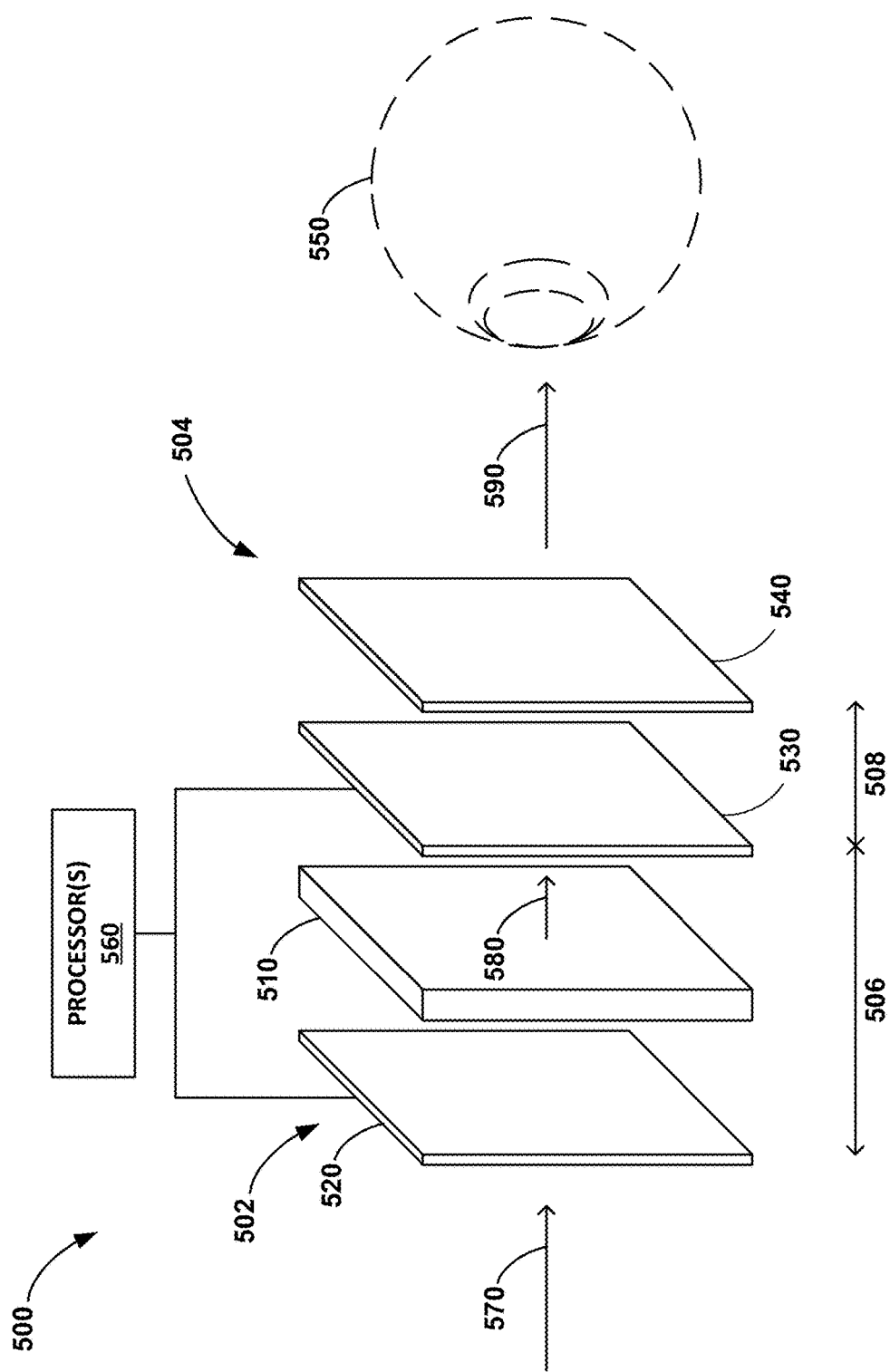

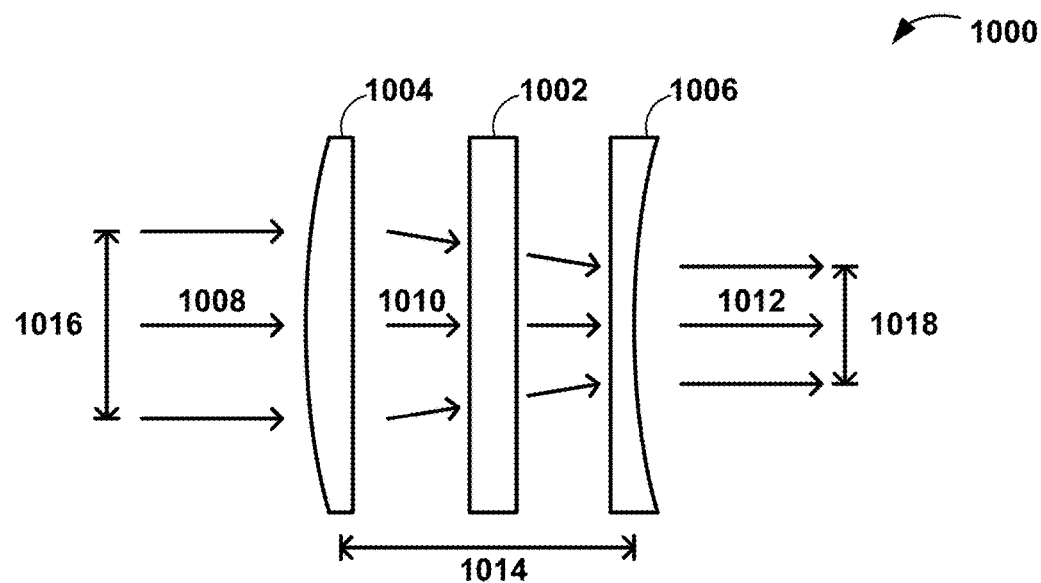
FIG. 10A
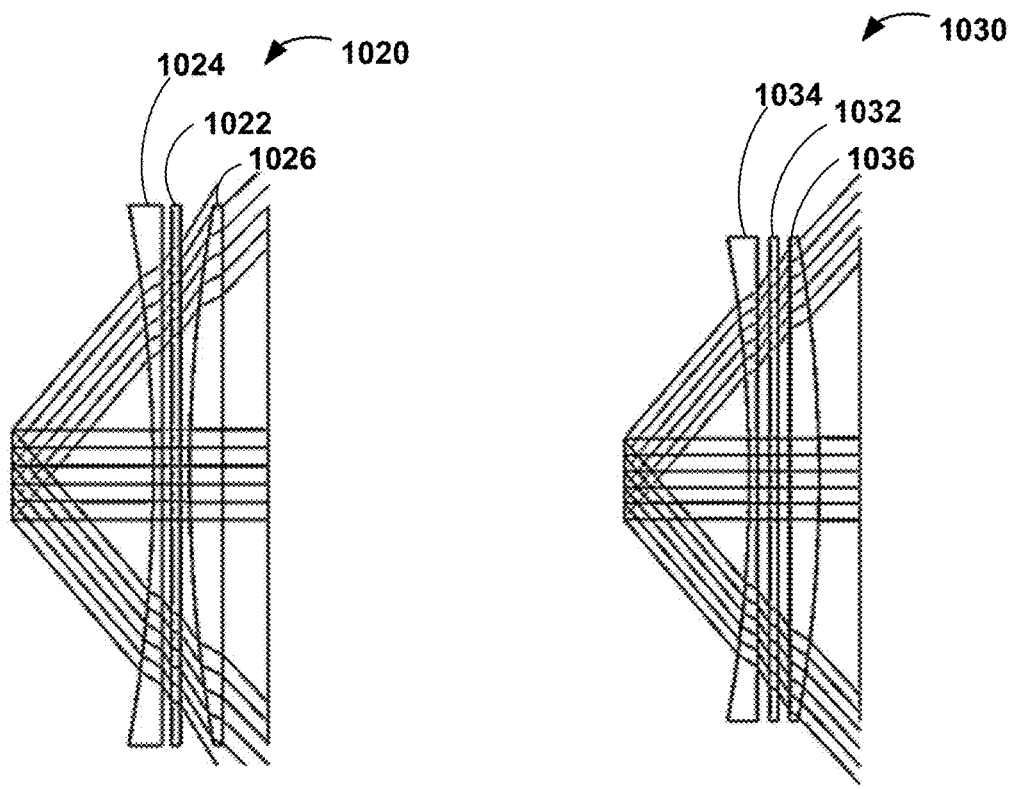
FIG. 10B
FIG. 10C

ACCOMMODATION ADJUSTABLE AND MAGNIFICATION CORRECTIVE OPTICAL SYSTEM

This application claims the benefit of U.S. Provisional Patent Application No. 62/962,579, filed on Jan. 17, 2020, which is hereby incorporated by reference herein in its entirety.

TECHNICAL FIELD

The disclosure generally relates to artificial reality systems, such as augmented reality, mixed reality, and/or virtual reality systems.

BACKGROUND

Artificial reality systems have applications in many fields such as computer gaming, health and safety, industry, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely consist of content that is generated by the system or may include generated content combined with real-world content (e.g., pass through views or captured real-world video and/or images of a user's physical environment). During operation, the user typically interacts with the artificial reality system to select content, launch applications, configure the system and, in general, experience artificial reality environments.

SUMMARY

In general, this disclosure relates to artificial reality systems, particularly systems that allow a user to view real-world content representing a physical environment of the user and present to the user virtual content generated by the system with a reduced or imperceptible change in magnification. This disclosure particularly relates to optical display assemblies for use in augmented and/or mixed reality systems, or any type of artificial reality system in which a user views both real-world and virtual content (e.g., simultaneously).

An example optical device assembly includes a virtual image content output device and a collection of optical elements. The collection of optical elements is configured to provide real-world and virtual content to a user when used in conjunction with the virtual image content output device. The collection of optical elements includes tunable lenses, each configured to deliver a desired optical power in accordance with electronic instructions to provide a range of adjustment of optical power.

Optical display assemblies described herein may enable an artificial reality system to display both real-world and virtual content so that a user of the artificial reality system may accommodate the real-world and virtual content with a reduced or eliminated perception of a change in magnification of the real-world and/or virtual content. For example, the example optical display assembly may be included in an artificial reality device, such as an HMD, to display virtual content at a selected distance from a user while maintaining an effective focus of real-world content. The optical display assembly may manipulate the virtual content image and real-world image using two or more tunable lenses. The optical display assembly may be responsive to the user such that, as the user changes his or her focus, the focal powers of the tunable lenses change. As a result, the user can adjust his or her vergence on both the virtual image content and the real-world content, yet avoid or reduce an accommodation conflict that would otherwise arise because of an inherent inability of the user to focus on both virtual image and real-world content at a same time.

In addition to reducing this accommodation conflict, example optical display assemblies may change the focus of virtual content while reducing or substantially eliminating distorting the real-world content with undesirable positive or negative magnification. For example, manipulation of the real-world and virtual content to reduce or avoid an accommodation conflict may involve convergence of real-world light using a first tunable lens and subsequent divergence of both real-world content and virtual content using a second tunable lens, such that a change in focal power of the first and second tunable lenses may result in increased or decreased magnification of the real-world content. To reduce or substantially eliminate this change in magnification, the example optical display assembly may manipulate the real-world image and the virtual content image using an additional lens or set of lenses to reduce the change in magnification of the real-world content that may result from the change in focal powers of the first and second tunable lenses, such that the user may perceive a reduced, or absent, magnification change. In this way, example optical display assemblies may display virtual and real-world content so that the user may perceive both virtual and real-world content provided by the optical display assemblies with reduced accommodation conflict and magnification change.

In one or more example aspects, an optical system includes a virtual image content output device, a first tunable lens on a real-world side of the virtual image content output device, a second tunable lens on an eye side of the virtual image content output device, and at least one compensating lens. The at least one compensating lens is configured to substantially eliminate magnification changes of real-world light between a real-world end of the optical system and an eye-side end of the optical system as a focal power of at least one of the first tunable lens or the second tunable lens changes.

In one or more example aspects, a head mounted display includes a frame or housing and an optical system coupled to the frame or housing. The optical system includes a virtual image content output device, a first tunable lens on a real-world side of the virtual image content output device, a second tunable lens on an eye side of the virtual image content output device, and at least one compensating lens. The at least one compensating lens is configured to substantially eliminate magnification changes of real-world light between a real-world end of the optical system and an eye-side end of the optical system as a focal power of at least one of the first tunable lens or the second tunable lens changes.

In one or more example aspects, a method includes controlling, by one or more processors, a focal power of at least one of a first tunable lens or a second tunable lens of an optical system. The first tunable lens is on a real-world side of a virtual image content output device and the second tunable lens is on an eye side of the virtual image content output device. The optical system includes at least one compensating lens configured to substantially eliminate magnification changes of real-world light between a real-world end of the optical system and an eye-side end of the optical system as the focal power of the at least one of the first tunable lens or the second tunable lens changes.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is an isometric view of an example accommodation adjustable and magnification corrective optical system, in accordance with some examples of the disclosure.

FIG. 10A is a side-view of an example optical system with a reduced distance between optical elements, in accordance with some examples of the disclosure.

FIG. 10B is a side-view of an example optical system with a reduced distance between optical elements, in accordance with some examples of the disclosure.

FIG. 10C is a side-view of an example optical system with a reduced distance between optical elements, in accordance with some examples of the disclosure.

DETAILED DESCRIPTION

Figure 1:
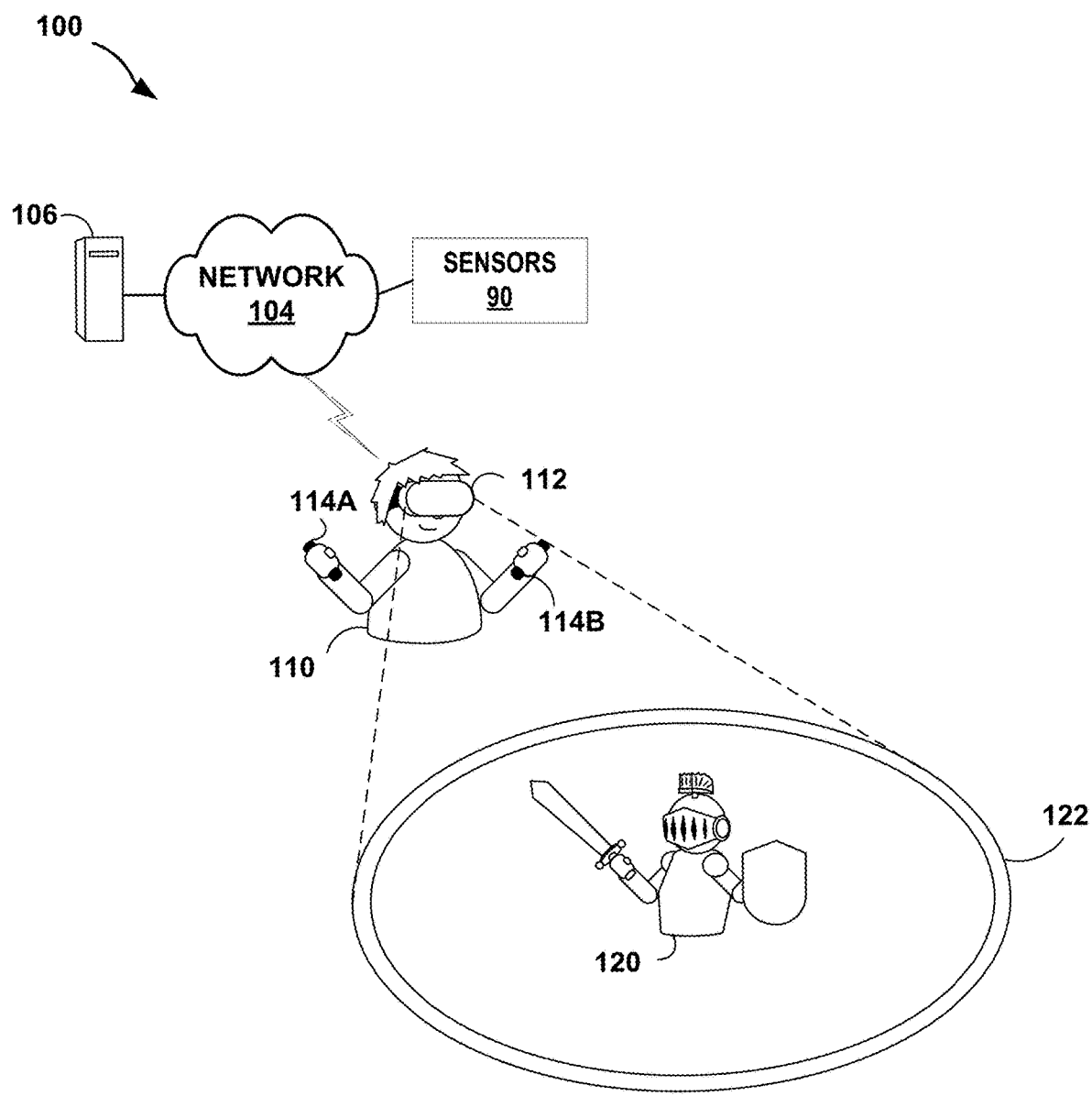
FIG. 1 is an illustration depicting an example artificial reality system that includes an accommodation adjustable and magnification corrective optical system, in accordance with the techniques described in this disclosure.

FIG. 1 is an illustration depicting an example artificial reality system configured to change a focus or apparent origin of virtual image content without substantially changing magnification of real-world content, in accordance with the techniques described in this disclosure. In the example of FIG. 1, artificial reality system 100 includes HMD 112, one or more controllers 114A and 114B (collectively, "controller(s) 114"), and may in some examples include one or more external sensors 90 and/or a console 106.

HMD 112 is typically worn by user 110 and includes the optical display assembly for presenting virtual image content 122 to user 110. HMD 112 includes an optical system that includes a first tunable lens on a real-world side of an image content output device, a second tunable lens on an eye side of the image content output device facing user 110, and at least one compensating lens. The first and second optical lenses are configured, in combination, to manipulate real-world light received by the optical assembly and image light received from the virtual image content output device to change a focus or apparent origin of virtual image content to cause the virtual image content to appear at a selected distance behind the virtual image content device and to maintain a substantially unchanged focus of the real-world content. The compensating lens(es) is configured to reduce or substantially eliminate magnification changes of real-world light between a real-world end of the optical system and an eye-side end of the optical system as a focal power of at least one of the first tunable lens or the second tunable lens changes. In this way, optical system 205 may change a focus or apparent origin of virtual image content without substantially changing magnification of real-world content. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Artificial reality system 100 may include glasses, or HMD 112 may comprise glasses or other display devices for presenting virtual image content 122 to user 110.

Each controller(s) 114 is an input device that user 110 may use to provide input to console 106, HMD 112, or another component of artificial reality system 100. Controller 114 may include one or more presence-sensitive surfaces for detecting user inputs by detecting a presence of one or more objects (e.g., fingers, stylus) touching or hovering over locations of the presence-sensitive surface. In some examples, controller(s) 114 may include an output display, which may be a presence-sensitive display. In some examples, controller(s) 114 may be a smartphone, tablet computer, personal data assistant (PDA), or other hand-held device. In some examples, controller(s) 114 may be a smartwatch, smartring, or other wearable device. Controller(s) 114 may also be part of a kiosk or other stationary or mobile system. Alternatively, or additionally, controller(s) 114 may include other user input mechanisms, such as one or more buttons, triggers, joysticks, D-pads, or the like, to enable a user to interact with and/or control aspects of virtual image content 122 presented to user 110 by artificial reality system 100.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as a mesh network or a short-range wireless communication medium, or combination thereof. Although HMD 112 is shown in this example as being in communication with, e.g., tethered to or in wireless communication with, console 106, in some implementations HMD 112 operates as a stand-alone, mobile artificial reality system, and artificial reality system 100 may omit console 106.

In general, artificial reality system 100 renders virtual image content 122 for display to user 110 at HMD 112 while allowing user 110 to view the real world, e.g., such that the virtual image content appears overlaid or otherwise integrated with the real world. In the example of FIG. 1, a user 110 views the virtual image content 122 constructed and rendered by an artificial reality application executing on HMD 112 and/or console 106. In some examples, items within virtual image content 122 may be mapped (e.g., pinned, locked, placed) to a particular position within the real world, e.g., relative to real-world content. A position for a virtual content item may be fixed, as relative to one of a wall, a table, or the earth, for instance. A position for a virtual image content item may be variable, as relative to controller(s) 114 or a user, for instance. In some examples, the particular position of a virtual image content item 120 within virtual image content 122 is associated with a position within the real-world, physical environment (e.g., on a surface of a physical object).

During operation, the artificial reality application constructs virtual image content 122 for display to user 110 by tracking and computing pose information for a frame of reference, typically a viewing perspective of HMD 112. Using HMD 112 as a frame of reference, and based on a current field of view as determined by a current estimated pose of HMD 112, the artificial reality application renders 3D virtual image content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real-world, physical environment, such as motion by user 110 and/or feature tracking information with respect to user 110. Based on the sensed data, the artificial reality application determines a current pose for the frame of reference of HMD 112 and, in accordance with the current pose, renders the virtual image content 122.

Artificial reality system 100 may trigger generation and rendering of virtual content items based on a current field of view of user 110, as may be determined by real-time gaze tracking of the user, or other conditions. More specifically, image capture devices 138 of HMD 112 capture image data representative of objects in the real-world, physical environment (i.e., real-world content) that are within a field of view of image capture device 138. The field of view typically corresponds with the viewing perspective of HMD 112.

In accordance with the techniques described herein, HMD 112 may be configured to change a focus or apparent origin of virtual image content 122 without substantially changing magnification of real-world content. HMD 112 includes an optical system that includes a virtual image content output device, a first tunable lens on a real-world side of a virtual image content output device, a second tunable lens on an eye side of the virtual image content output device facing user 110, and at least one compensating lens. The optical system is configured to control a focal power of the first tunable lens to manipulate real-world light and a focal power of the second tunable lens to manipulate image light received from the virtual image content output device and real-world light. The compensating lens(es) is configured to substantially eliminate magnification changes of real-world light between a real-world end of the optical system and an eye-side end of the optical system as a focal power of at least one of the first tunable lens or the second tunable lens changes.

The optical system may be configured to emit virtual image content and real-world content so that user 110 may focus on both the virtual image content and real-world content at a same time. For example, to form a virtual content image, the virtual image content output device may emit image light and one or more processors may control a focal power of the second tunable lens to manipulate the image light emitted by the virtual image content output device to cause the virtual image content to appear at a selected distance behind the virtual image content output device on the real-world side of the virtual image content output device. The focal power of the second tunable lens may also distort real-world light received by the optical system. To correct this distortion and form a real-world image, the one or more processors may control a focal power of the first tunable lens to manipulate real-world light received at a real-world-side end of the optical system to cause an effective focus of the real-world content to appear substantially unaffected by the optical system. As a result, the effective focus of the real-world content is substantially unaffected by the focus of the virtual image content, and user 110 may focus her or his vergence on both the virtual image content and the real-world content.

To emit the virtual image content and real-world content so that user 110 may perceive the virtual image content and the real-world content in a same plane without perceiving a substantial change in magnification, the optical systems discussed herein include at least one compensating lens configured to substantially eliminate magnification changes of real-world light between a real-world end of the optical system and an eye-side end of the optical system as a focal power of at least one of the first tunable lens or the second tunable lens changes. For example, an optical system with only two tunable lenses may cause a change in magnification of the real-world content by converging and subsequently diverging (or vice versa) the real-world light to substantially collimate the real-world light emitted to user 110. To reduce this change in magnification, the at least one compensating lens may provide one or more additional points of refraction so that real-world light emitted from the optical system may be both substantially collimated and with no or nearly no change in magnification. The one or more processors may control a focal power of the first tunable lens so that, in combination with the compensating lens(es), a change in focal power of the second tunable lens leaves a magnification of real-world light substantially unchanged. In this way, the optical systems described herein may change a focus or apparent origin of virtual image content without substantially changing magnification of real-world content.

In addition to substantially eliminating magnification changes of real-world content, the at least one compensating lens may provide prescription correction of the virtual image content and real-world content and/or structural support to the first or second tunable lenses. For example, a focal power of the at least one compensating lens may be selected to adjust for a corrective strength of user 110, such as myopia, hypermetropia, astigmatism, or other refractive error in a human eye. As another example, a surface of the at least one compensating lens may be in contact with a surface of at least one of the first or second tunable lenses to provide physical support or protection of the first or second tunable lens and, in some instances, replace a protective lens that may otherwise be present.

Figure 2:
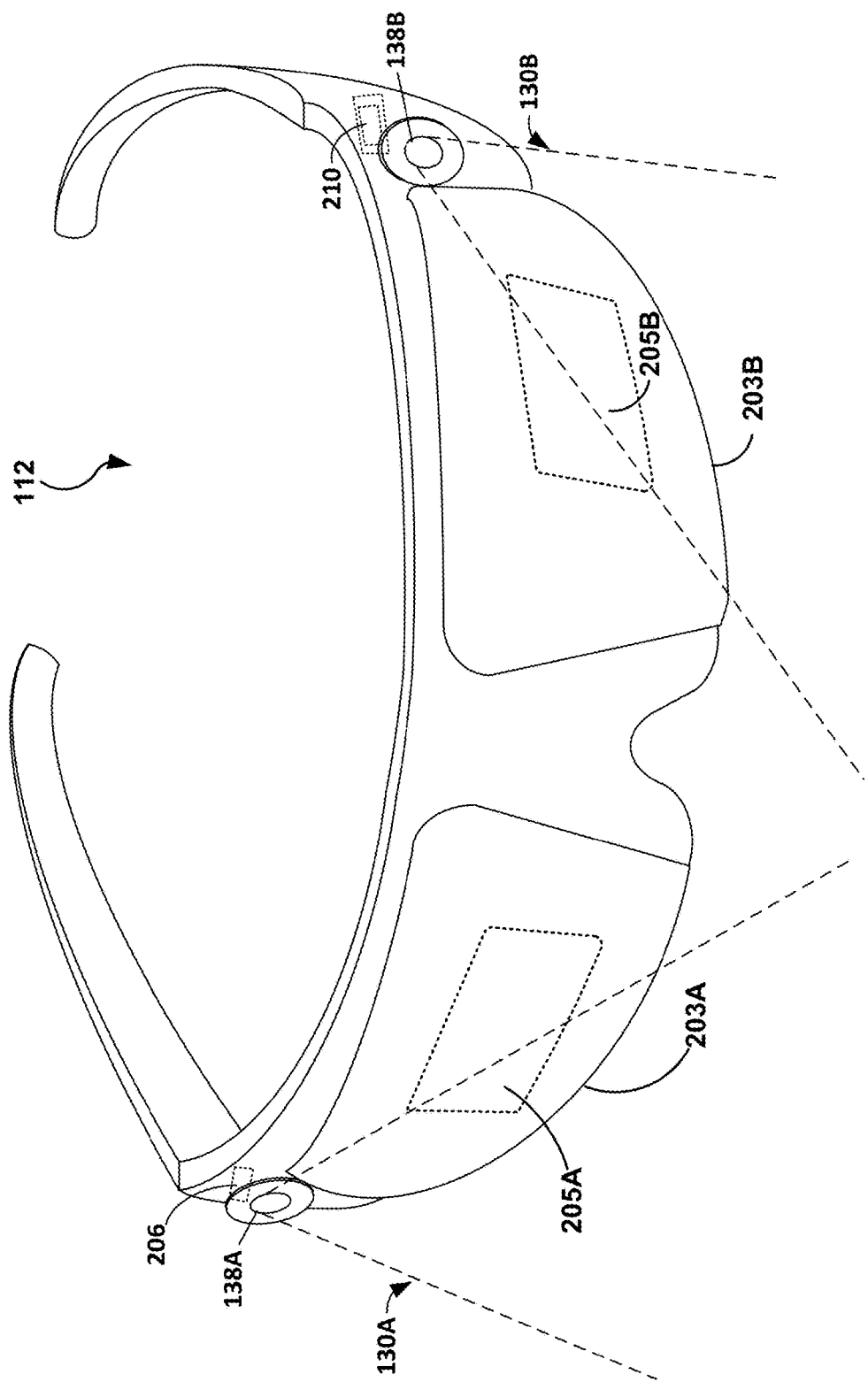
FIG. 2 is an illustration depicting an example HMD that includes an accommodation adjustable and magnification corrective optical system, in accordance with techniques described in this disclosure.

FIG. 2 is an illustration depicting an example HMD 112 configured to change a focus or apparent origin of virtual image content without substantially changing magnification of real-world content, in accordance with techniques described in this disclosure. HMD 112 of FIG. 2 may be an example of any of HMDs 112 of FIG. 1. HMD 112 may be part of an artificial reality system, such as artificial reality system 100 of FIG. 1, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2 includes one or more interior-facing virtual image content output devices 203A and 203B (individually, "virtual image content output device 203" and collectively, "virtual image content output devices 203") configured to present virtual image content to the user and one or more optical systems 205A and 205B (collectively, "optical systems 205") configured to manage light output by interior-facing virtual image content output devices 203A and 203B. Virtual image content output devices 203 may be a transparent electronic display (e.g., a transparent OLED), a light combiner which transmits real world light and redirects virtual image content light from a projector to the user's eye, a waveguide with an output coupler that directs virtual image content light from a projector to the user's eye, or the like. Virtual image content output devices 203 may include any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2, virtual image content output devices 203 form a stereoscopic display for providing separate images to each eye of the user.

In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as goggles.

Optical system 205 includes optical elements configured to manage light output by virtual image content output devices 203 for viewing by the user of HMD 112 (e.g., user 110 of FIG. 1). The optical elements may include, for example, one or more lens, one or more diffractive optical element, one or more reflective optical elements, one or more waveguide, or the like, that manipulates (e.g., focuses, defocuses, reflects, refracts, diffracts, or the like) light output by virtual image content output devices 203. For example, optical system 205 may be any of the optical systems described herein with reference to FIGS. 1, 5, 6, 7, and 8.

In accordance with the techniques described herein, optical system 205 may be configured to change a focus or apparent origin of virtual image content without substantially changing magnification of real-world content. Optical system 205 includes a first tunable lens on a real-world side of each virtual image content output device 203, a second tunable lens on an eye side of each virtual image content output device 203 facing a user, and at least one compensating lens. Optical system 205 is configured to control a focal power of the first tunable lens to manipulate real-world light and a focal power of the second tunable lens to manipulate image light received from a respective virtual image content output device 203 and real-world light. The compensating lens(es) is configured to substantially eliminate magnification changes of real-world light between a real-world end of optical system 205 and an eye-side end of optical system 205 as a focal power of at least one of the first tunable lens or the second tunable lens changes. For example, optical system 205 may be configured to control a focal power of the second tunable lens to manipulate image light emitted by virtual image content output device 203 to cause the virtual image content to appear at a selected distance behind virtual image content output device 203 on the real-world side of virtual image content output device 203. Optical system 205 may be configured to control a focal power of the first tunable lens so that, in combination with the compensating lens(es), a change in focal power of the second tunable lens leaves a magnification of real-world light substantially unchanged. In this way, optical system 205 may change a focus or apparent origin of virtual image content without substantially changing magnification of real-world content.

As further shown in FIG. 2, in this example, HMD 112 further includes one or more motion sensors 206, such as one or more accelerometers (also referred to as inertial measurement units or "IMUS") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

Figure 3:
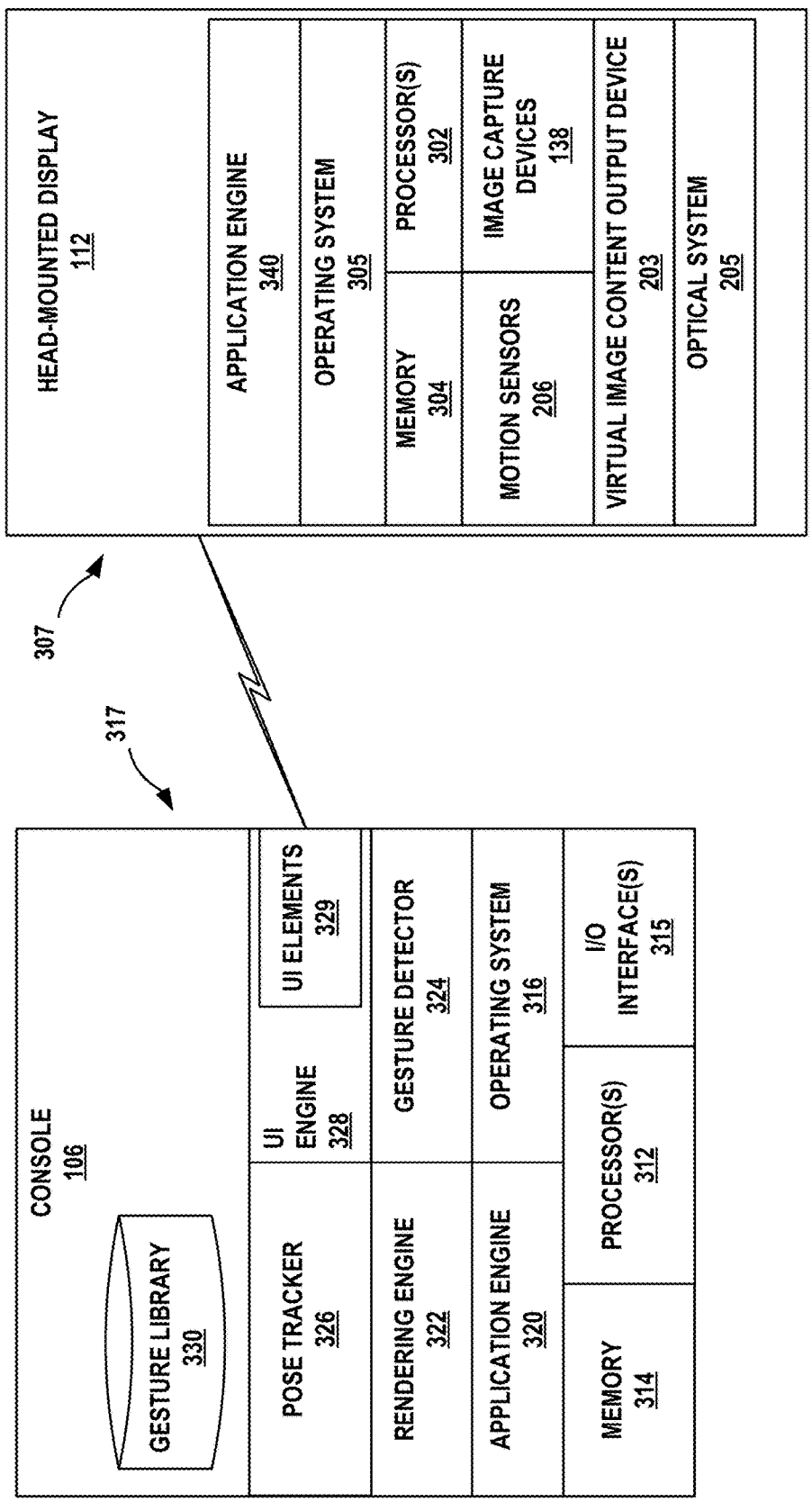
FIG. 3 is a block diagram showing example implementations of a console and an HMD of the multi-device artificial reality system of FIG. 1, in accordance with techniques described in this disclosure.

FIG. 3 is a block diagram showing example implementations of an artificial reality system that includes console 106 and HMD 112, in accordance with techniques described in this disclosure. In the example of FIG. 3, console 106 performs pose tracking, gesture detection, and user interface generation and rendering for HMD 112 based on sensed data, such as motion data and image data received from HMD 112 and/or external sensors.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIG. 2, processors 302 are coupled to virtual image content output device 203, motion sensors 206, image capture devices 138, and, in some examples, optical system 205. In some examples, processors 302 and memory 304 may be separate, discrete components. In other examples, memory 304 may be on-chip memory collocated with processors 302 within a single integrated circuit.

In general, console 106 is a computing device that processes image and tracking information received from cameras image capture devices 138 HMD 112 (FIG. 2) to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software applications 317. Processors 312 are coupled to one or more I/O interfaces 315, which provides one or more I/O interfaces for communicating with external devices, such as a keyboard, game controller(s), display device(s), image capture device(s), HMD(s), peripheral device(s), and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine 328.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for HMD 112 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an augmented reality environment. User interface engine 328 generates a virtual user interface to include one or more virtual user interface elements 329, such as a virtual drawing interface, a selectable menu (e.g., drop-down menu), virtual buttons, a directional pad, a keyboard, or other user-selectable user interface elements, glyphs, display elements, content, user interface controls, and so forth.

Console 106 may output this virtual user interface and other artificial reality content, via a communication channel, to HMD 112 for display at HMD 112.

Based on the sensed data from any of the image capture devices 138 or 102, or other sensor devices, gesture detector 324 analyzes the tracked motions, configurations, positions, and/or orientations of controllers 114 and/or objects (e.g., hands, arms, wrists, fingers, palms, thumbs) of the user 110 to identify one or more gestures performed by user 110. More specifically, gesture detector 324 analyzes objects recognized within image data captured by image capture devices 138 of HMD 112 and/or sensors 90 and external cameras 102 to identify controller(s) 114 and/or a hand and/or arm of user 110, and track movements of controller(s) 114, hand, and/or arm relative to HMD 112 to identify gestures performed by user 110. In some examples, gesture detector 324 may track movement, including changes to position and orientation, of controller(s) 114, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of controller(s) 114 and process the user inputs to detect one or more gestures performed by user 110 with respect to controller(s) 114.

Figure 4:
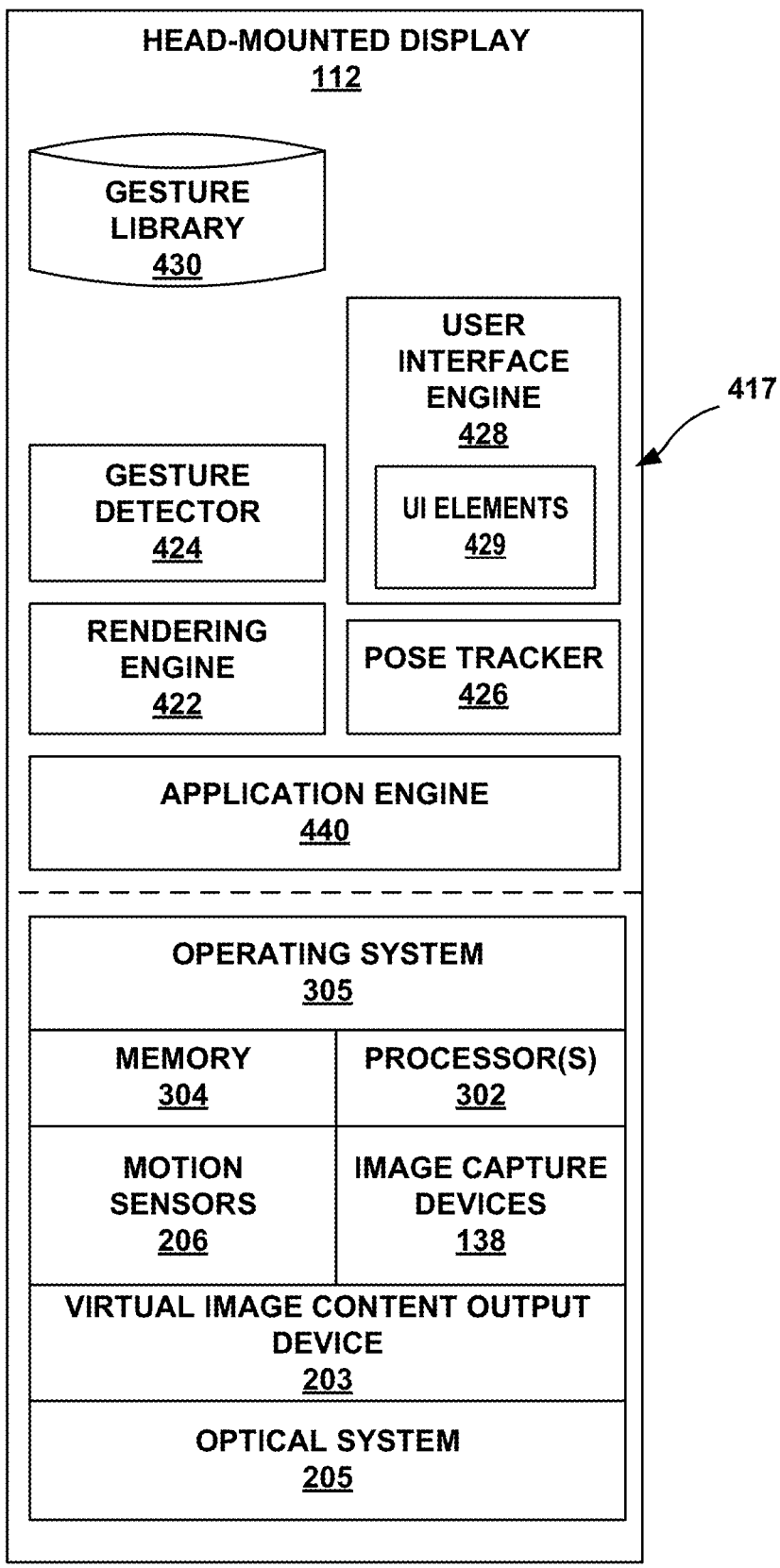
FIG. 4 is a block diagram depicting an example in which all computing functions are performed by the HMD of the artificial reality system of FIG. 1, in accordance with the techniques described in this disclosure.

FIG. 4 is a block diagram depicting an example in which HMD 112 is a standalone artificial reality system, in accordance with the techniques described in this disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to virtual image content output device 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, controller(s) 114, or other sensor devices, gesture detector 424 analyzes the tracked motions, configurations, positions, and/or orientations of controller(s) 114 and/or objects (e.g., hands, arms, wrists, fingers, palms, thumbs) of the user to identify one or more gestures performed by user 110.

FIG. 5 is an isometric view of an example accommodation adjustable and magnification corrective optical system 500, in accordance with some examples of the disclosure. In some examples, optical system 500 includes a virtual image content output device 510, a first tunable lens 520, a second tunable lens 530, and a compensating lens 540.

Virtual image content output device 510 emits image light toward an eye 550 of a viewing user. In some examples, virtual content output device 510 may be, e.g., a light manipulating element, such as a light combiner or a waveguide and output coupling grating, configured to receive image light generated by a light source, such as a projector or LED array, and redirect the image light. In some examples, virtual image content output device 510 may be, e.g., a light source, such as a transparent display panel, configured to generate and emit image light. In some examples, virtual image content output device 510 may be configured to be at least partially transmissive of real-world light incident on virtual content output device 510. For example, virtual content output device 510 may be configured to transmit at least a portion of real-world light incident on a real-world side of virtual content output device 510 out an eye side of virtual content output device 510.

Optical system 500 includes at least first tunable lens 520 and second tunable lens 530. While illustrated as single lenses, in other examples, first and second tunable lenses 520, 530 may include any number of lenses. First tunable lens 520 and second tunable lens 530 may each be communicatively coupled to one or more processors or controllers 560. Each of first tunable lens 520 and second tunable lens 530 may include any suitable lenses or lens elements configured to have adjustable focal power. For example, each of first tunable lens 520 and second tunable lens 530 may include one or more elements, such as actuators, configured to receive control signals from processors 560 and control a focal power of a respective first tunable lens 520 and second tunable lens 530 in response to receiving the control signals.

In some examples, first tunable lens 520 and/or second tunable lens 530 may be a liquid lens. In some examples, the liquid lens may be a membrane-type liquid lens. For example, the liquid lens may include one or more liquids sandwiched between an optically clear flexible membrane and rigid substrate or sandwiched between two optically clear flexible membranes. A curvature of one or both optically clear flexible membranes may be changed by application of energy supplied by one or more actuators, such as an electrostatic or electromagnetic actuator. In some example, the liquid lens may be of a membrane-less-type liquid lens. For example the liquid lens may include two immiscible, optically clear liquids with different indices of refraction that form a deformable surface. In some examples, the liquid lens may be an electrowetting lens, in which a potential difference may be applied between a conducting liquid and a non-conductive surface to vary a contact angle of the conducting liquid.

Optical system 500 includes at least one compensating lens 540 (referred to as "compensating lens 540 for simplicity of explanation). As will be described further below, compensating lens 540 is configured to substantially eliminate magnification changes of real-world light 570 between real-world end 502 of optical system 500 and eye-side end 504 of optical system 500 as a focal power of at least one of first tunable lens 520 or second tunable lens 530 changes.

In some examples, compensating lens 540 may be a non-tunable lens configured to provide a single, fixed focal power. For example, compensating lens 540 may be, e.g., a convex lens, such as a biconvex, plano-convex, or positive meniscus lens; a concave lens, such as a biconcave, plano-concave, or negative meniscus lens; a pancake lens of any shape; a Fresnel lens; and the like. In some examples, compensating lens 540 may be a coating. For example, compensating lens 540 may be a coating on at least one of first tunable lens 520 and second tunable lens 530. In some examples, compensating lens 540 may be a tunable lens that includes one or more actuators configured to receive control signals, such as from processors 560, and control a focal power of compensating lens 540 in response to receiving the control signals, such as described with respect to first tunable lens 520 and second tunable lens 530 above. In some examples, compensating lens 540 may be configured to provide prescription correction, as will be described further in FIG. 8C below.

In some examples, optical system 500 may include one or more processors or controllers 560 configured to control a focal power of first tunable lens 520 and a focal power of second tunable lens 530. Processors or controllers 560 may include, for example, processors 302 or 312 of FIGS. 3 and 4. In some examples, optical system 500 may be configured to receive control signals from one or more processors outside optical system 500.

In the example of FIG. 5, optical system 500 may be configured to receive real-world light 570A at a real-world end 502 of optical system 500 and emit real-world light and virtual image light 590 (referred to as "combined light 590") from an eye-side end 504 of optical system 500. First tunable lens 520 is disposed on a real-world side of virtual image content output device 510 and configured to receive real-world light 570 from an environment and emit real-world light 570 at a selected focal power. Second tunable lens 530 is disposed on an eye side of virtual image content output device 510 and configured to receive real-world light 570 and virtual image light 580 and emit real-world light 570 and virtual image light 580 at a selected focal power. Compensating lens 540 may be disposed on an eye side of second tunable lens 530 and configured to receive real-world light 570 and virtual image light 580 and emit combined light 590. In the example of FIG. 5, first tunable lens 520 and compensating lens 540 form real-world end 502 and eye-side end 504; however, in other examples, other lenses or other optical elements of optical system 500 may form real-world end 502 and/or eye-side end 504, as illustrated in the examples of FIG. 7 below.

Optical system 500 may be configured to change a focus or apparent origin of virtual image content (e.g., virtual image light 580 received by second tunable lens 530 and emitted by compensating lens 540) without substantially changing magnification of real-world content (e.g., real-world light 570 received by first tunable lens 520 and emitted by compensating lens 540). In the example of FIG. 5, processors 560 may be configured to control a focal power of first tunable lens 520 to manipulate real-world light 570 and a focal power of second tunable lens 530 to manipulate image light 580 received from virtual image content output device 510 and real-world light 570. Compensating lens 540 may be configured to, in combination with first and second tunable lenses 530, substantially eliminate magnification changes of real-world light 570 between real-world end 502 of optical system 500 and an eye-side end 504 of optical system 500 as a focal power of at least one of first tunable lens 520 or second tunable lens 530 changes.

As described above with respect to FIG. 1, a user may only focus on real-world and virtual image content at a same perceived distance. Optical system 500 may be configured to emit virtual image content and real-world content (e.g., combined light 590) so that a user may focus on both the virtual image content and real-world content at a same time (e.g., so that virtual image content appears to originate at a substantially similar distance to a location of the real world on which the user is focusing). To form a virtual content image, processors 560 may be configured to control a focal power of second tunable lens 530 to manipulate image light 580 to cause the virtual image content to appear at a selected distance behind virtual image content output device 510 on the real-world side of virtual image content output device 510. For example, processors 560 may send control signals to second tunable lens 530 configured to cause second tunable lens 530 to emit light at a particular focal power. The control signals may be configured to account for a focal power of compensating lens 540. For example, processors 560 may send control signals for an effective focus of the virtual image content at an effective focal power that includes a focal power of compensating lens 540 and a focal power of second tunable lens 530. In some examples, second tunable lens 530 is tunable in a range of about 3 diopters. In some examples, second tunable lens 530 is tunable in a range of about 2 diopters.

Processors 560 may be configured to control a focal power of first tunable lens 520 and second tunable lens 530 such that optical system 500 is afocal (i.e., no net convergence or divergence) to real-world light 570. In focusing virtual image light 580, the focal power of second tunable lens 530 may also refract real-world light 570, such that if real-world light 570 is not pre-conditioned prior to being received by second tunable lens 530, real-world light of combined light 590 may be out of focus (i.e. defocused). To pre-condition real-world light 570 and form a real-world image, processors 560 may be configured to control a focal power of first tunable lens 520 to manipulate real-world light 570 received at real-world end 502 of optical system 500 to cause an effective focus of the real-world content to appear unaffected by optical system 500 (i.e., optical system 500 is afocal to real-world light 570). For example, processors 560 may be configured to control the focal power of first tunable lens 520 such that combined light 590 is substantially collimated. As a result, the effective focus position of the real-world content (i.e., a focus between real-world end 502 and eye-side end 504) is substantially unaffected by the focus of the virtual image content by second tunable lens 530, and the user may focus her or his vergence on both the virtual image content and the real-world content. In some examples, optical system 500 may be configured to change a focus or apparent origin of virtual image content within a range of about 0 diopter to about 3 diopters without substantially changing magnification of real-world content. In some examples, optical system 500 may be configured to focus on virtual image content without perceptively defocusing real-world content. For example, a user may not be able to perceive a defocus of real-world light that is less than 0.3 diopter. In some examples, optical system 500 may maintain a defocus of real-world light 570 less than 0.3 diopter.

In some examples, processors 560 may be configured to control a focal power of first tunable lens 520 and second tunable lens 530 such that optical system 500 has a particular focus for real-world light 570 and virtual image light 580. For example, as will be described further below, a user may have a particular correction index for their eyesight. Processors 560 may be configured to control the focal power of first tunable lens 520 and second tunable lens 530 such that optical system 500 has an effective focal power corresponding to the particular correction index.

Processors 560 may be configured to control the focal power of first tunable lens 520 and second tunable lens 530 such that real-world light 570 does not substantially change in magnification as a focal power of first tunable lens 520 and/or second tunable lens 530 changes. To enable optical system 500 to emit the virtual image content and real-world content so that the user may perceive the virtual image content and the real-world content without perceiving a substantial change in magnification, optical system 500 includes compensating lens 540. Processors 560 may be configured to control a focal power of first tunable lens 520 and second tunable lens 530 to substantially eliminate magnification changes of real-world light 570 between real-world end 502 and eye-side end 504 as a focal power of at least one of first tunable lens 520 and second tunable lens 530 changes.

For example, an optical system with only two tunable lenses may cause a change in magnification of real-world content by converging and subsequently diverging (or vice versa) the real-world light to substantially collimate the real-world light emitted to the user. To reduce this change in magnification, compensating lens 540 may provide one or more additional plane of refraction so that real-world light emitted from optical system 500 may have a particular focal power (e.g., substantially collimated) with no change in magnification. Processors 560 may control a focal power of first tunable lens 520 so that, in combination with compensating lens 540, a change in focal power of second tunable lens 530 leaves a magnification of real-world light 570 substantially unchanged through optical system 500. In this way, optical system 500 may change a focus or apparent origin of virtual image content without substantially changing magnification of real-world content.

Without being limited to any particular theory, a change in magnification may be approximated by the following equation (for infinitely thin lenses):

$$M = 1 + L_1 D_1 + L_2 D_2 \quad \text{[Equation 1]}$$

In the above Equation 1, M represents magnification of optical system 500, $L_1$ represents a distance 506 between first tunable lens 520 and second tunable lens 530, $D_1$ represents a focal power of first tunable lens 520, $L_2$ represents a distance 508 between second tunable lens 530 and compensating lens 540, and $D_2$ represents a focal power of second tunable lens 530. The one or more processors may select a focal power of second tunable lens 530 to focus on a virtual image and select a focal power of first tunable lens 520 such that a magnification of optical system 500 is approximately 1.

Figure 6A:
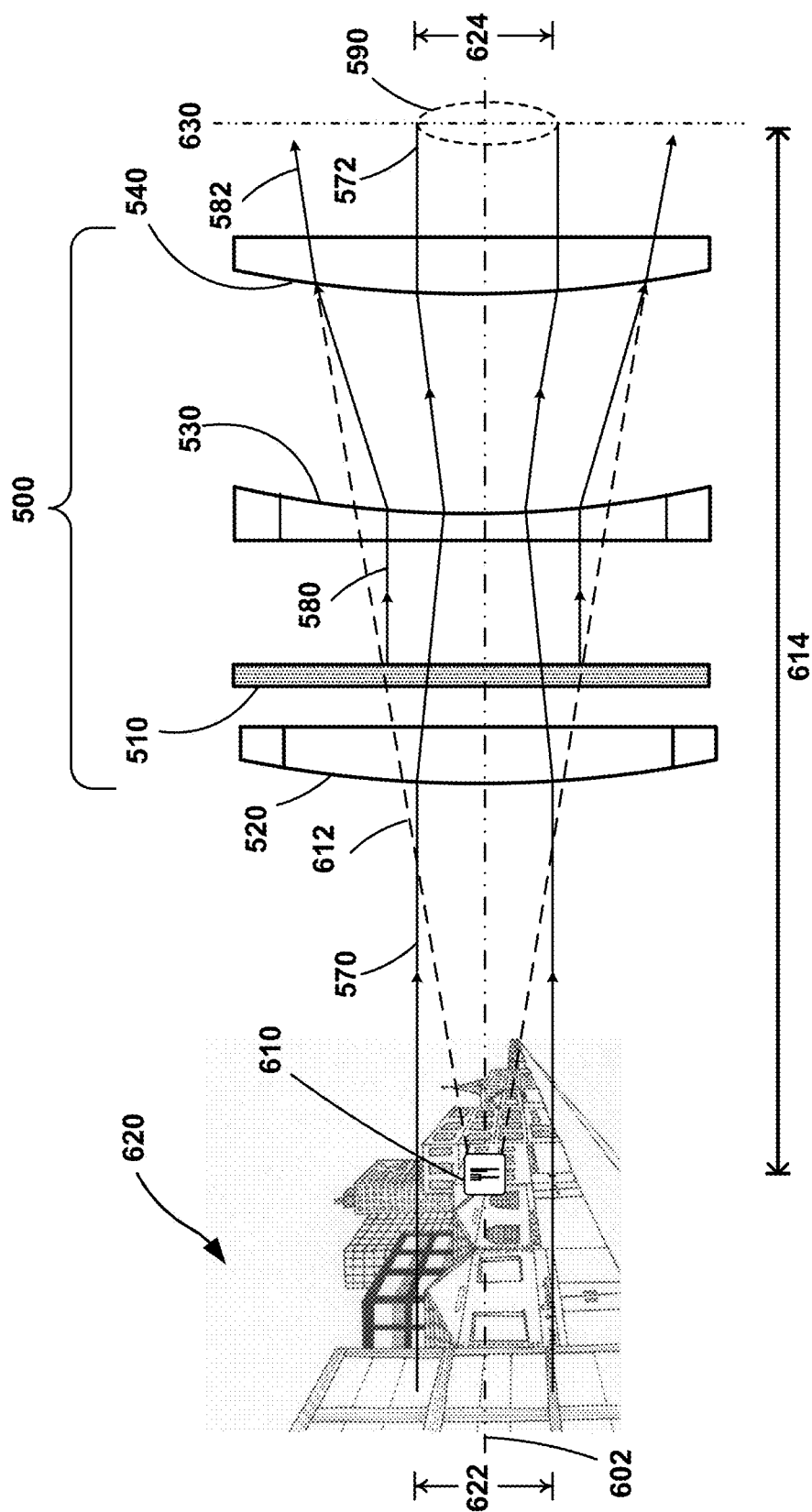
FIG. 6A is a side-view of an example accommodation adjustable and magnification corrective optical system focusing a first virtual content image at a first distance, in accordance with some examples of the disclosure.
Figure 6B:
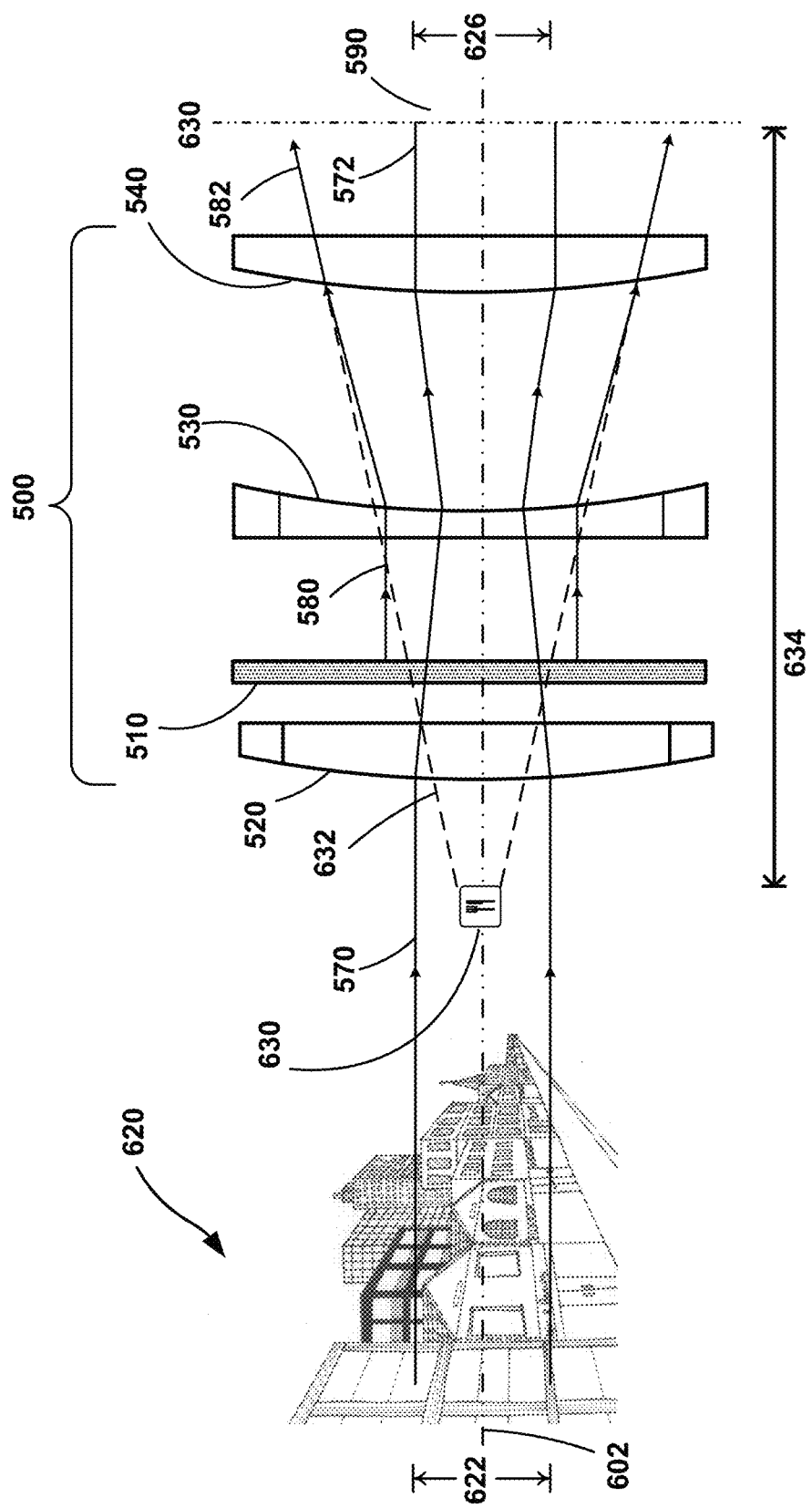
FIG. 6B is a side-view of an example accommodation adjustable and magnification corrective optical system focusing a second virtual content image at a second distance, in accordance with some examples of the disclosure.

FIGS. 6A and 6B are side views of an example accommodation adjustable and magnification corrective optical system 500, in accordance with some examples of the disclosure. Optical system 500 includes first tunable lens 520, second tunable lens 530, compensating lens 540, and virtual image content output device 510 arranged along an optical axis 602. First tunable lens 520, second tunable lens 530, compensating lens 540, and virtual image content output device 510 are configured such that image light 580 emitted by virtual image content output device 510 forms a virtual content image 610, 630 when viewed along optical axis 602 by a user and real-world light 570 incident upon first tunable lens 520 is transmitted through optical system 500 and forms real-world image 620 when viewed along optical axis 602, such that virtual content image 610, 630 augments real-world image 620.

FIG. 6A is a side view of optical system 500 focusing on a first virtual content image 610. To form virtual content image 610, one or more processors may control a focal power of second tunable lens 530 to cause virtual content image 610 to appear at a first distance 614 behind virtual image content output device 510 on the real-world side of virtual image content output device 510. This first distance 614 may correspond to a first virtual focus 612. Virtual image content output device 510 may emit image light 580, and second tunable lens 530 may refract image light 580 according to the selected focal power. Compensating lens 540 may refract image light 580 to produce focused image light 582 having first virtual focus 612, such that a user may perceive first virtual content image 610 at first distance 614. As such, the one or more processors may control second tunable lens 530 based on a focal power of compensating lens 540, such as in examples in which image light 580 is refracted by compensating lens 540.

To form real-world image 620, the one or more processors may control a focal power of first tunable lens 520 so that, in combination with compensating lens 540, a change in focal power of second tunable lens 530 to focus virtual content image 610 leaves a magnification of real-world light 570, and thus real-world image 620, substantially unchanged. First tunable lens 520 may receive real-world light 570 having an initial beam diameter 622. First tunable lens 520 may refract real-world light 570 according to the selected focal power. Second tunable lens 530 may refract real-world light 570 according to the selected focal power for focusing on virtual content image 610. Compensating lens 540 may refract real-world light 570 to produce real-world light 572 having a first beam diameter 624. As such, the one or more processors may control first tunable lens 520 based on the selected focal power of second tunable lens 530 and the focal power of compensating lens 540.

FIG. 6B is a side view of optical system 500 focusing on a second virtual content image 630. For example, a user may choose to focus on second virtual content image 630, rather than first virtual content image 610. To form virtual content image 630, one or more processors may control a focal power of second tunable lens 530 to cause virtual content image 630 to appear at a second distance 634 behind virtual image content output device 510 on the real-world side of virtual image content output device 510. This second distance 634 may correspond to a second virtual focus 632, and in the example of FIG. 6B, is a closer distance than first distance 614 of FIG. 6A. Virtual image content output device 510 may emit image light 580, and second tunable lens 530 may refract image light 580 according to the selected focal power. Compensating lens 540 may refract image light 580 to produce focused image light 582 having second virtual focus 632, such that a user may perceive second virtual content image 630 at second distance 634.

To form real-world image 620, the one or more processors may control a focal power of first tunable lens 520 so that, in combination with compensating lens 540, the change in focal power of second tunable lens 530 to focus on second virtual content image 630, rather than first virtual content image 610, leaves a magnification of real-world light 570, and thus real-world image 620, substantially unchanged. First tunable lens 520 may refract real-world light 570 according to the selected focal power. Second tunable lens 530 may refract real-world light 570 according to the selected focal power for focusing on second virtual content image 630. Compensating lens 540 may refract real-world light 570 to produce real-world light 572 having a second beam diameter 626. First beam diameter 624 of real-world light 572 of FIG. 6A may be substantially the same as second beam diameter 626 of real-world light 572 of FIG. 6B, such that a user may not perceive a change in magnification between focusing on first virtual content image 610 and second virtual content image 630.

In some examples, initial beam diameter 622 of real-world light 570 may be substantially the same as either first beam diameter 624 and/or second beam diameter 626, such that the user may not perceive any magnification of real-world light 570 through optical system 500. For example, while optical system 500 may be configured to reduce or eliminate changes in magnification due to a change in focal power of first tunable lens 520 or second tunable lens 530, real-world images may still appear with increased or decreased magnification as compared to a real-world object perceived without optical system 500. Some display systems, such as head-mounted display 112 of FIG. 2, may only partially cover a field of vision of a user, such that real-world light may be viewed without manipulation through optical system 500. To reduce magnification through optical system 500, the one or more processors may be configured to control the focal power of first tunable lens 520 to cause the initial beam diameter to be equivalent to a final beam diameter (e.g., first beam diameter 624 or second beam diameter 626). In this way, optical system 500 may be integrated into systems that may only partially cover a field of vision of a user, such that distortion between real-world light 570 received by a user without manipulation through optical system 500 and real-world light 572 received by a user after manipulation through optical system 500 may be reduced.

In the example optical system 500 of FIGS. 5, 6A, and 6B, at least one compensating lens 540 is disposed adjacent second tunable lens 530 opposite virtual image content output device 510. However, in other optical system configurations, compensating lens 540 may be disposed at other positions within the optical system.

Figure 7A:
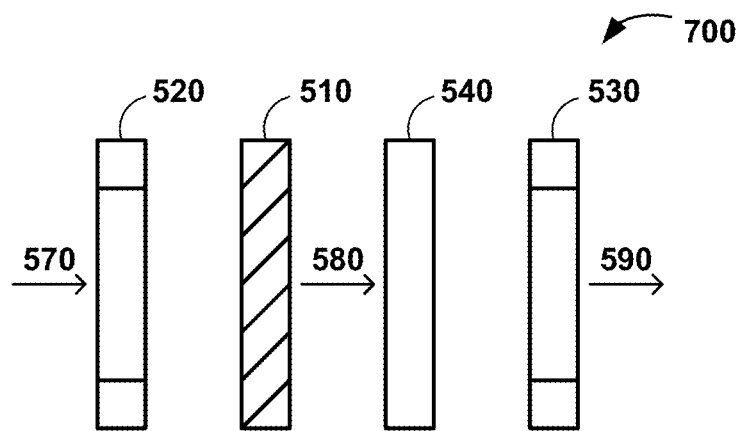
FIG. 7A is a side-view of an example accommodation adjustable and magnification corrective optical system, in accordance with some examples of the disclosure.

FIG. 7A is a side-view of an example accommodation adjustable and magnification corrective optical system 700, in accordance with some examples of the disclosure. In the example of FIG. 7A, compensating lens 540 is disposed between second tunable lens 530 and virtual image content output device 510. First tunable lens 520 is disposed on a real-world side of virtual image content output device 510 and configured to receive real-world light 570 from an environment and emit real-world light 570 at a selected focal power. Compensating lens 540 is configured to receive real-world light 570 and virtual image light 580 and emit light toward second tunable lens 530. Second tunable lens 530 is disposed on an eye side of virtual image content output device 510 and configured to receive real-world light 570 and virtual image light 580 and emit real-world light 570 and virtual image light 580 at a selected focal power as combined light 590.

Figure 7B:
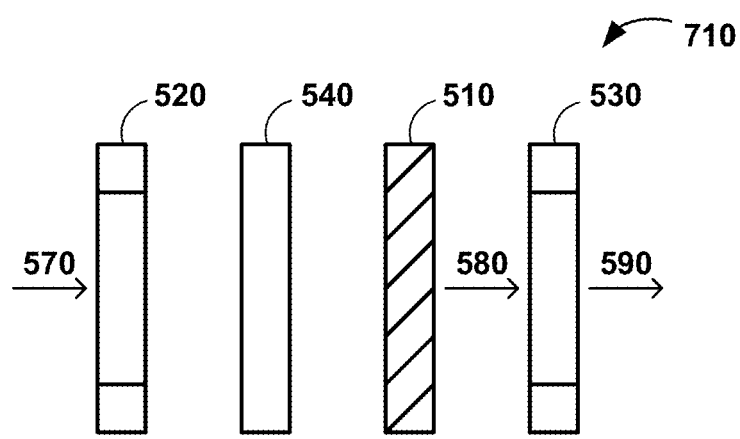
FIG. 7B is a side-view of an example accommodation adjustable and magnification corrective optical system, in accordance with some examples of the disclosure.

FIG. 7B is a side-view of an example accommodation adjustable and magnification corrective optical system 710, in accordance with some examples of the disclosure. In the example of FIG. 7B, compensating lens 540 is disposed between first tunable lens 520 and virtual image content output device 510. First tunable lens 520 is disposed on a real-world side of virtual image content output device 510 and configured to receive real-world light 570 from an environment and emit real-world light 570 at a selected focal power. Compensating lens 540 is configured to receive real-world light 570 from first tunable lens 520 and emit light toward virtual image content output device 510. Second tunable lens 530 is disposed on an eye side of virtual image content output device 510 and configured to receive real-world light 570 and virtual image light 580 and emit real-world light 570 and virtual image light 580 at a selected focal power as combined light 590.

Figure 7C:
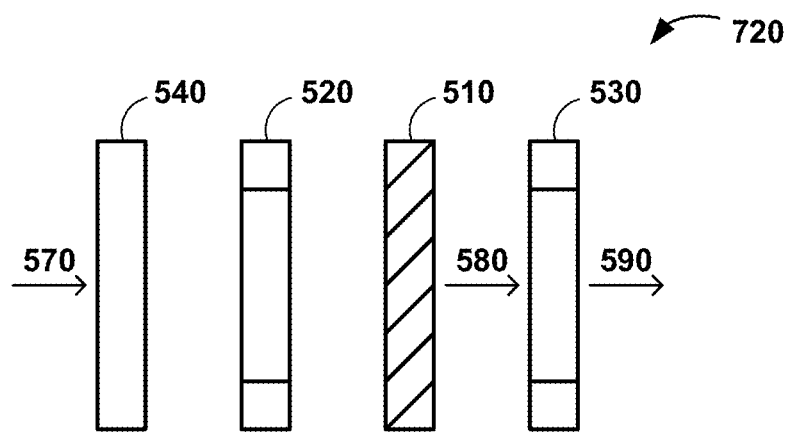
FIG. 7C is a side-view of an example accommodation adjustable and magnification corrective optical system, in accordance with some examples of the disclosure.

FIG. 7C is a side-view of an example accommodation adjustable and magnification corrective optical system 720, in accordance with some examples of the disclosure. In the example of FIG. 7C, compensating lens 540 is disposed adjacent first tunable lens 520 opposite virtual image content output device 510. Compensating lens 540 is configured to receive real-world light 570 and emit light toward first tunable lens 520. First tunable lens 520 is disposed on a real-world side of virtual image content output device 510 and configured to receive real-world light 570 from compensating lens 540 and emit real-world light 570 at a selected focal power. Second tunable lens 530 is disposed on an eye side of virtual image content output device 510 and configured to receive real-world light 570 and virtual image light 580 and emit real-world light 570 and virtual image light 580 at a selected focal power as combined light 590. As described further below, but incorporating compensating lens 540 at an end of optical system 720, compensating lens 540 may further provide protection for first tunable lens 520.

Figure 8A:
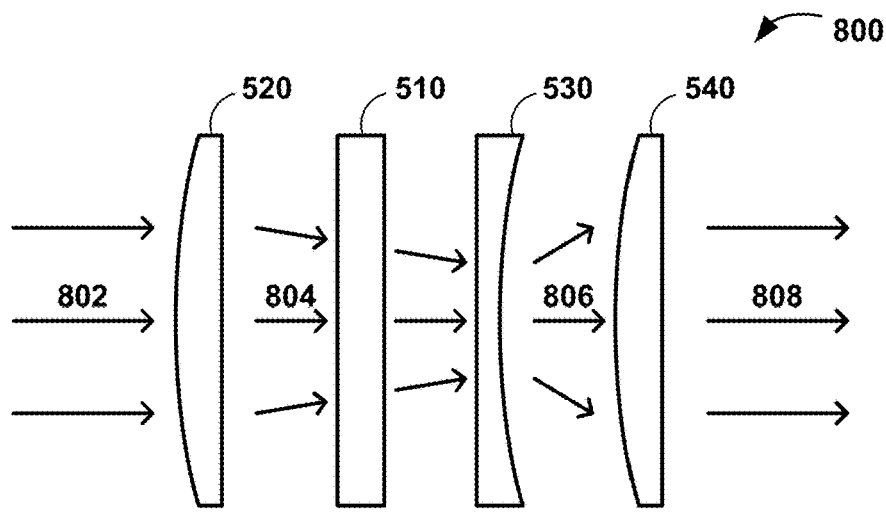
FIG. 8A is a side-view of an example accommodation adjustable and magnification corrective optical system having a converging/diverging/converging configuration, in accordance with some examples of the disclosure.

Optical systems discussed herein may use a variety of different arrangements of refractive lenses. In some examples, optical systems discussed herein may first converge real-world light, subsequently diverge the real-world light and, optionally the image light, and again converge the real-world light and the image light to focus the image light and leave a magnification of real-world light substantially unchanged. FIG. 8A is a side-view of an example accommodation adjustable and magnification corrective optical system 800, in accordance with some examples of the disclosure. In the example of FIG. 8A, first tunable lens 520 is a converging lens, second tunable lens 530 is a diverging lens, and compensating lens 540 is a converging lens. First tunable lens 520 may receive real-world light 802 from an environment and emit converging real-world light 804 at a converging focal power. Second tunable lens 530 may receive converging real-world light 804 and virtual image light and emit diverging real-world light and virtual image light 806 at a diverging focal power. Compensating lens 540 may receive diverging real-world light and virtual image light 806 and emit collimated combined light 808 at a converging focal power. By first converging real-world light 802 to produce converging real-world light 804, real-world light 804 may be incident on a relatively small area of virtual image content output device 510 compared to real-world light that is not converged. As a result, virtual image content output device 510 may emit virtual image light from a relatively smaller area, thus reducing a size and/or power of virtual image content output device 510.

Figure 8B:
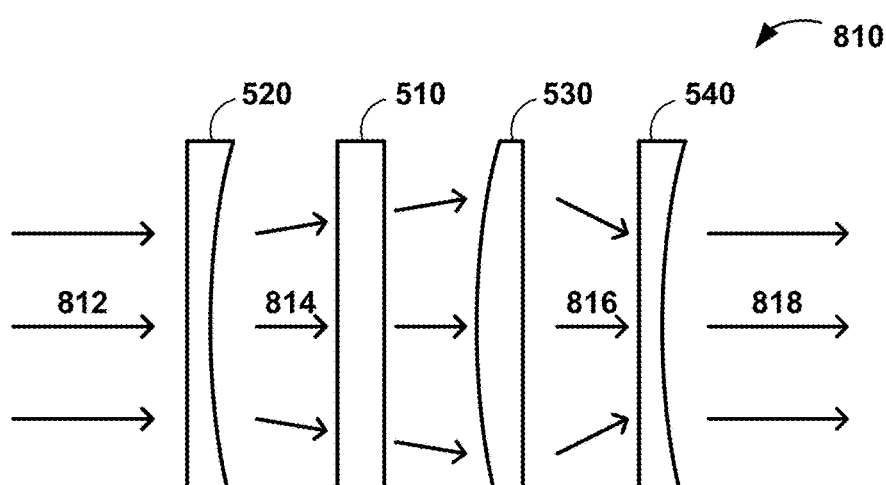
FIG. 8B is a side-view of an example accommodation adjustable and magnification corrective optical system having a diverging/converging/diverging configuration, in accordance with some examples of the disclosure.

In some examples, optical systems discussed herein may first diverge real-world light, subsequently converge the real-world light and, optionally, the image light, and again diverge the real-world light and the image light to focus the image light and leave a magnification of real-world light substantially unchanged. FIG. 8B is a side-view of an example accommodation adjustable and magnification corrective optical system 810, in accordance with some examples of the disclosure. In the example of FIG. 8B, first tunable lens 520 is a diverging lens, second tunable lens 530 is a converging lens, and compensating lens 540 is a diverging lens. First tunable lens 520 may receive real-world light 812 from an environment and emit diverging real-world light 814 at a diverging focal power. Second tunable lens 530 may receive diverging real-world light 814 and virtual image light and emit converging real-world light and virtual image light 816 at a converging focal power. Compensating lens 540 may receive converging real-world light and virtual image light 816 and emit collimated combined light 818 at a diverging focal power. By first diverging real-world light 812 to produce diverging real-world light 814, real-world light 814 may be incident on a relatively large area of virtual image content output device 510 compared to real-world light that is not diverged. As a result, virtual image content output device 510 may emit virtual image light from a relatively larger area, thus increasing a perceived resolution of virtual image content output device 510.

While compensating lens 540 is illustrated in FIGS. 8A and 8B as disposed adjacent second tunable lens 530 opposite virtual image content output device 510, in other systems, compensating lens 540 may be disposed at a variety of positions within optical systems 700, 710, 720, such as illustrated in FIGS. 7A-7C.

Figure 8C:
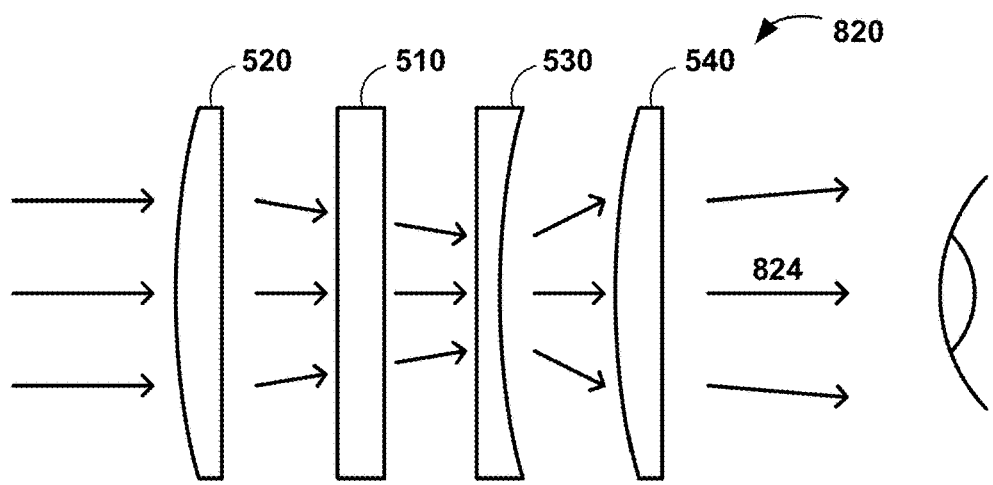
FIG. 8C is a side-view of an example accommodation adjustable and magnification corrective optical system that includes a compensating lens configured for optical correction, in accordance with some examples of the disclosure.

In some examples, optical systems discussed herein may be configured to provide optical correction for a user. For example, a user may wear corrective lenses to provide optical correction of one or more vision disorders, such as myopia, hypermetropia, astigmatism, or other conditions characterized by refractive error in a human eye. In examples in which an optical system is incorporated into a head-mounted display and worn on a head of a user, the head-mounted display may be uncomfortable when worn with the corrective lenses (e.g., pressure on spectacles or dryness with contact lenses). Optical systems discussed herein may provide the optical correction of the corrective lenses, such that the user may more comfortably wear the head-mounted display. FIG. 8C is a side-view of an example accommodation adjustable and magnification corrective optical system 820, in accordance with some examples of the disclosure. In the example of FIG. 8C, in addition to substantially eliminating magnification changes of real-world light, compensating lens 540 may provide prescription correction that may otherwise be provided by corrective lenses. As illustrated in FIG. 8C, real-world and image light 824 is emitted as diverging light at a focal power for optical system 820 toward a user having myopia. The focal power of optical system 820 may be equivalent to a focal power of a prescription lens of the user providing correction for myopia. In this way, optical system 820 may incorporate optical correction into a head-mounted display or other systems without modifying control of first and/or second tunable lenses 520 and 530.

Figure 9A:
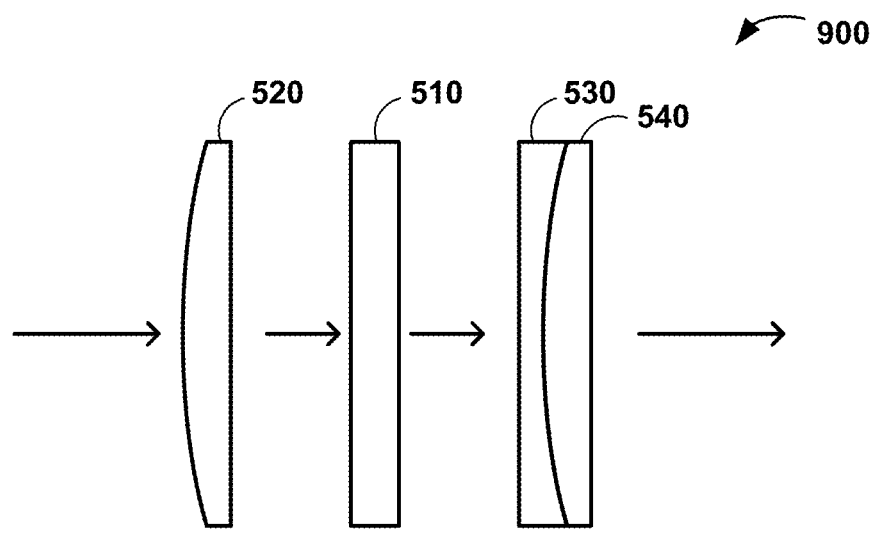
FIG. 9A is a side-view of an example accommodation adjustable and magnification corrective optical system, in accordance with some examples of the disclosure.
Figure 9B:
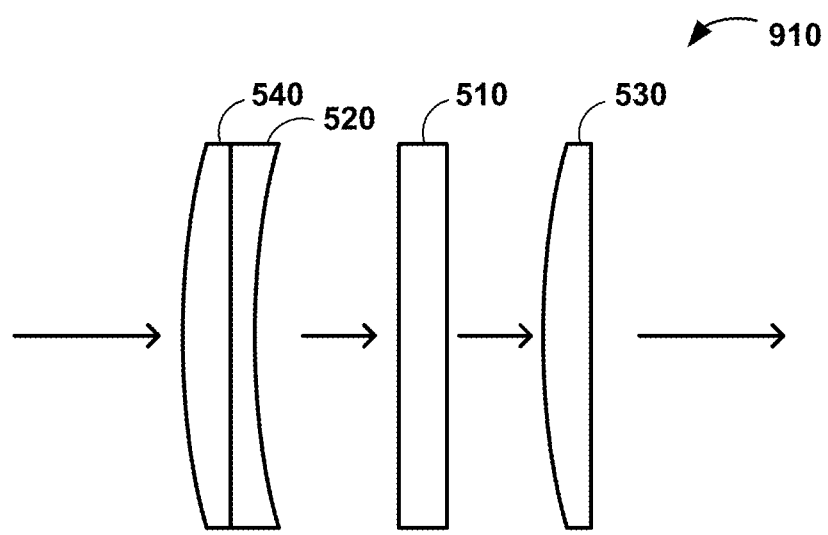
FIG. 9B is a side-view of an example accommodation adjustable and magnification corrective optical system, in accordance with some examples of the disclosure.

In some examples, a surface of at least one compensating lens 540 is in contact with a surface of first tunable lens 520 or a surface of second tunable lens 530. For example, tunable lenses may include membranes or other structures that are relatively fragile. To protect these fragile structures, a protective surface may be positioned on real-world end 502 and eye-side end 504 of optical system 500. In some examples, a surface of compensating lens 540 may function as the protective surface for either or both first tunable lens 520 and/or second tunable lens 530. For example, as described above, compensating lens 540 may be a static lens fabricated from a material having greater resistance to scratching, puncture, and/or deformation than tunable lenses 520 and 530. FIG. 9A is a side-view of an example accommodation adjustable and magnification corrective optical system, in accordance with some examples of the disclosure. In the example of FIG. 9A, a real-world side surface of compensating lens 540 is in contact with an eye side surface of second tunable lens 530, such that an eye side surface of compensating lens 540 forms eye-side end 504 of optical system 500 exposed to an environment of optical system 500. FIG. 9B is a side-view of an example accommodation adjustable and magnification corrective optical system, in accordance with some examples of the disclosure. In the example of FIG. 9A, an eye side surface of compensating lens 540 is in contact with a real-world side surface of first tunable lens 520, such that a real-world side surface of compensating lens 540 forms real-world end 502 of optical system 500 exposed to an environment of optical system 500. In this way, compensating lens 540 may provide physical support or protection of the first tunable lens 520 or second tunable lens 530 and/or replace a protective lens that may otherwise be present.

In some examples, optical systems discussed herein may be configured to change a focus or apparent origin of virtual image content while reducing a change in magnification of real-world content by reducing a distance between adjacent optical elements. As described in Equation 1 above, a magnification between two lenses may be related to a distance between the two lenses. FIG. 10A is a side-view of an example optical system, in accordance with some examples of the disclosure. Optical system 1000 includes a virtual image content output device 1002, a first tunable lens 1004, and a second tunable lens 1006. Optical system 1000 receives real-world light 1008 having an initial beam diameter 1016, converges the real-world light using first tunable lens 1004 to form converging real-world light 1010, and diverges the real-world light 1010 using second tunable lens 1006 to form collimated real-world light 1012 having a final beam diameter 1018. As a distance 1014 between first tunable lens 1004 and second tunable lens 1006 decreases, a difference between initial beam diameter 1016 and final beam diameter 1018 may decrease, such that a magnification of optical system 1000, and thus a change in magnification of optical system 1000 as a focal power of second tunable lens 1006 changes, may decrease.

Figure 10D:
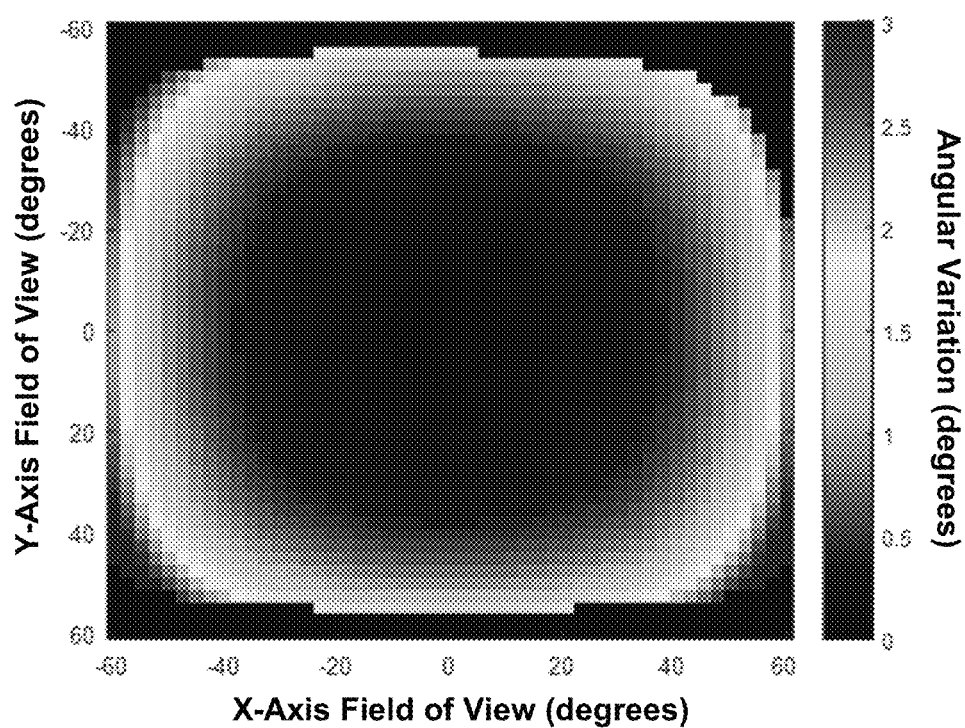
FIG. 10D is a chart illustrating angular variation over a field of view in the optical system of FIG. 10B, in accordance with some examples of the disclosure.
Figure 10E:
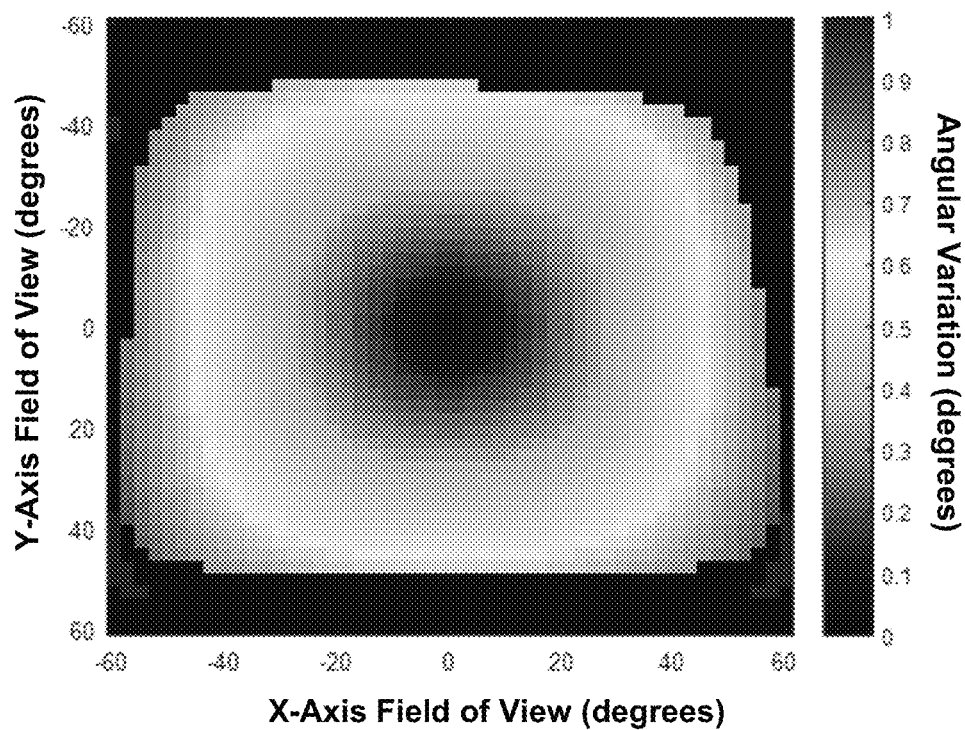
FIG. 10E is a chart illustrating angular variation over a field of view in the optical system of FIG. 10B, in accordance with some examples of the disclosure.

FIG. 10B is a side-view of an example optical system 1020, in accordance with some examples of the disclosure. Optical system 1020 includes a convex tunable lens 1024, a virtual image content output device 1022, and a concave lens 1026. FIG. 10C is a side-view of an example optical system 1030, in accordance with some examples of the disclosure. Optical system 1030 includes a convex tunable lens 1034, a virtual image content output device 1032, and a concave lens 1036. As shown in FIGS. 10B and 10C, while optical systems 1020 and 1030 may still retain some magnification, such magnification may be relatively small compared to optical systems in which optical elements are relatively widely spaced. FIG. 10D is a chart illustrating angular variation over a field of view in the optical system of FIG. 10B, in accordance with some examples of the disclosure. As illustrated in FIG. 10D, a center of the field of view has a small angular variation (which may represent magnification), with the angular variation increasing toward edges of the field of view. FIG. 10E is a chart illustrating angular variation over a field of view in the optical system of FIG. 10B, in accordance with some examples of the disclosure. As illustrated in FIG. 10E, a center of the field of view has a relatively larger angular variation compared with FIG. 10D, but has a relatively smaller angular variation at edges of the field of view.

Figure 11A:
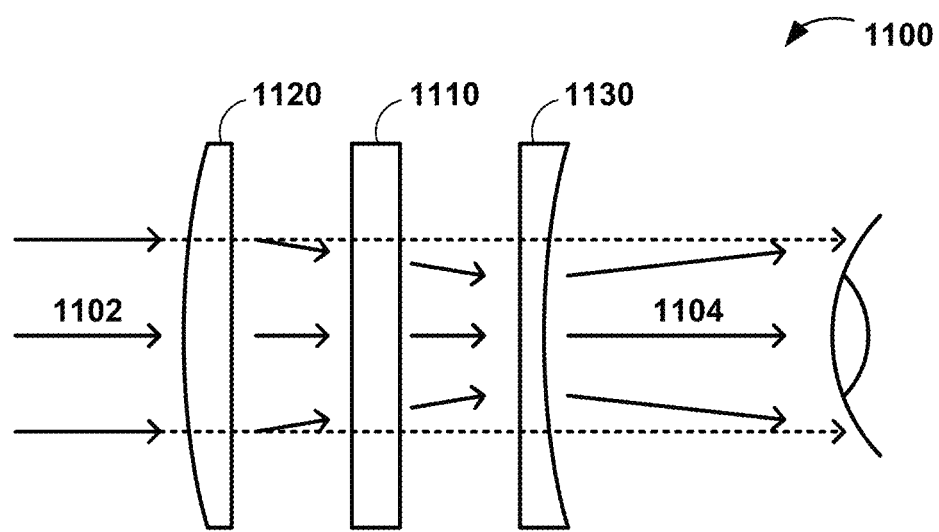
FIG. 11A is a side-view of an example optical system, in accordance with some examples of the disclosure.
Figure 11B:
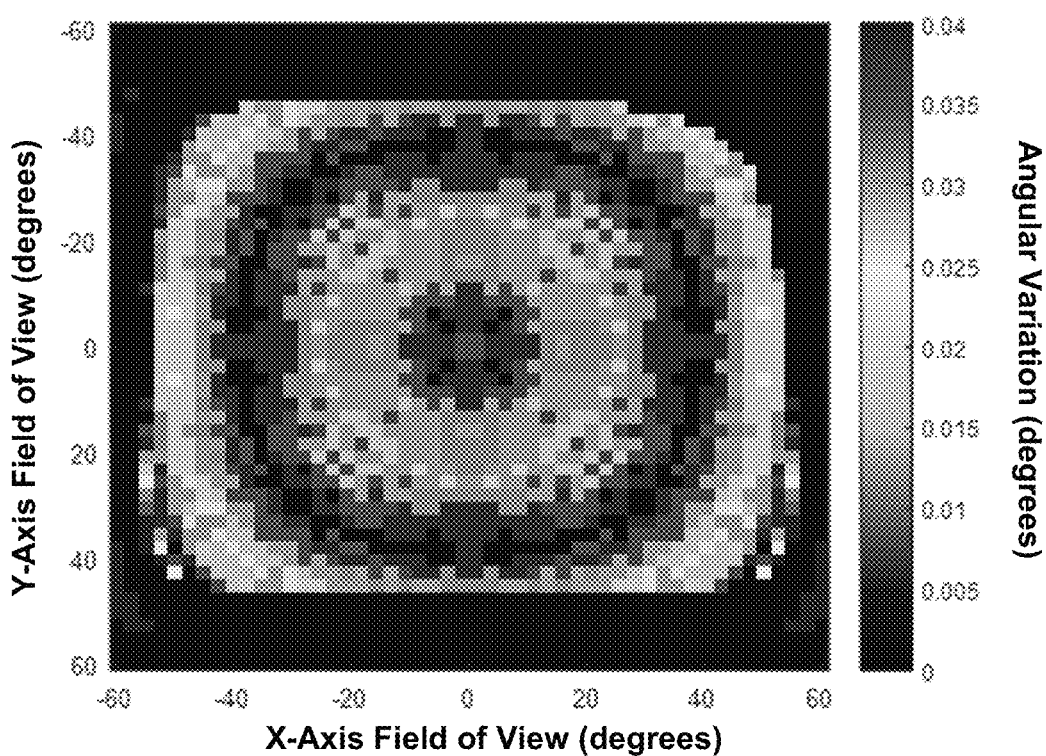
FIG. 11B is a chart illustrating angular variation over a field of view in the optical system of FIG. 11A, in accordance with some examples of the disclosure.

In some examples, optical systems discussed herein may be configured to change a focus or apparent origin of virtual image content while eliminating a change in magnification of real-world content for small fields of view by permitting defocus below a threshold value. As described above, small amounts of defocus may not be perceptible to a user. As such, optical systems discussed herein may balance an amount of defocus and an amount of change in magnification to reduce a perceptibility of distortion by a user. FIG. 11A is a side-view of an example optical system, in accordance with some examples of the disclosure. Optical system 1100 includes a first tunable lens 1120, a virtual image content output device 1110, and a second tunable lens 1130. Optical system 1100 is configured to receive real-world light 1102 and emit real-world light 1104 at a small amount of defocus, such that a magnification of real-world light 1104 as the real-world light 1104 is incident at a user's eye is approximately 1. In some examples, optical system 1100 may maintain a defocus below a defocus threshold value while substantially eliminating a change in magnification as a focal power of second tunable lens 1130 changes. In some examples, the defocus threshold is less than about 0.7 diopter, such as less than 0.3 diopter. FIG. 11B is a chart illustrating angular variation over a field of view in the optical system of FIG. 11A, in accordance with some examples of the disclosure. As illustrated in FIG. 11B, angular variation may be relatively small compared to the examples of FIGS. 10D and 10E.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. An optical system comprising:
   a virtual image content output device;
   a first tunable lens on a real-world side of the virtual image content output device;
   a second tunable lens on an eye side of the virtual image content output device;
   at least one compensating lens, wherein the at least one compensating lens is configured to substantially eliminate magnification changes of real-world light between a real-world end of the optical system and an eye-side end of the optical system as a focal power of at least one of the first tunable lens or the second tunable lens changes,
   wherein the first tunable lens is a converging lens, the second tunable lens is a diverging lens, and the at least one compensating lens comprises a converging lens.

2. The system of claim 1, wherein the at least one compensating lens is disposed adjacent the first tunable lens opposite the virtual image content output device.

3. The system of claim 1, wherein the at least one compensating lens is disposed adjacent the second tunable lens opposite the virtual image content output device.

4. The system of claim 1, wherein the at least one compensating lens is disposed between the first tunable lens and the virtual image content output device.

5. The system of claim 1, wherein the at least one compensating lens is disposed between the second tunable lens and the virtual image content output device.

6. The system of claim 1, wherein the at least one compensating lens is further configured to provide prescription correction.

7. The system of claim 1, wherein at least one of the first tunable lens or the second tunable lens comprises a liquid lens.

8. The system of claim 1, further comprising a controller coupled to the first tunable lens and the second tunable lens, wherein the controller is configured to control a focal power of the second tunable lens to cause virtual image content to appear at a selected distance behind the virtual image content output device on the real-world side of the virtual image content output device.

9. The system of claim 8, wherein the controller is configured to control the first tunable lens so that, in combination with the compensating lens, a change in focal power of the second tunable lens leaves a magnification of real-world light substantially unchanged.

10. The system of claim 1, wherein the first tunable lens, the second tunable lens, the compensating lens, and the virtual image content output device are configured such that:
    image light emitted by the virtual image content output device forms a virtual content image when viewed along an optical axis by a user; and
    real-world light incident upon the first tunable lens is transmitted through the optical system and forms a real-world image when viewed along the optical axis by the user,
    wherein the virtual content image augments the real-world image.

11. The system of claim 1, wherein the second tunable lens is tunable in a range of about 3 diopters.

12. The system of claim 1, wherein the second tunable lens is tunable in a range of about 2 diopters.

13. The system of claim 1, wherein a surface of the at least one compensating lens is in contact with a surface of the first tunable lens or a surface of the second tunable lens.

14. The system of claim 1, wherein the virtual image content output device comprises at least one of a light combiner, a waveguide and output coupling grating, or a transparent display panel.

15. The system of claim 1, further comprising a head mounted display, wherein the head mounted display comprises a frame or housing, and wherein the virtual image content output device, the first tunable lens, the second tunable lens, and the at least one compensating lens are coupled to the frame or housing.

16. A method, comprising:
    controlling, by one or more processors, a focal power of at least one of a first tunable lens or a second tunable lens of an optical system,
    wherein the first tunable lens is on a real-world side of a virtual image content output device,
    wherein the second tunable lens is on an eye side of the virtual image content output device,
    wherein the optical system includes at least one compensating lens configured to substantially eliminate magnification changes of real-world light between a real-world end of the optical system and an eye-side end of the optical system as the focal power of the at least one of the first tunable lens or the second tunable lens changes, and
    wherein the first tunable lens is a converging lens, the second tunable lens is a diverging lens, and the at least one compensating lens comprises a converging lens.

17. The method of claim 16, further comprising controlling, by the one or more processors, the focal power of the second tunable lens to cause virtual image content to appear at a selected distance behind the virtual image content output device on the real-world side of the virtual image content output device.

18. The method of claim 17, further comprising controlling, by the one or more processors, the first tunable lens so that, in combination with the at least one compensating lens, a change in focal power of the second tunable lens leaves a magnification of real-world light substantially unchanged.

19. The method of claim 16, wherein the first tunable lens, the second tunable lens, the at least one compensating lens, and the virtual image content output device are configured such that:
    image light emitted by the virtual image content output device forms a virtual content image when viewed along an optical axis by a user; and
    real-world light incident upon the first tunable lens is transmitted through the optical system and forms a real-world image when viewed along the optical axis by the user,
    wherein the virtual content image augments the real-world image.

20. An optical system comprising:
    a virtual image content output device;
    a first tunable lens on a real-world side of the virtual image content output device;
    a second tunable lens on an eye side of the virtual image content output device;
    at least one compensating lens, wherein the at least one compensating lens is configured to substantially eliminate magnification changes of real-world light between a real-world end of the optical system and an eye-side end of the optical system as a focal power of at least one of the first tunable lens or the second tunable lens changes,
    wherein a surface of the at least one compensating lens is in contact with a surface of the first tunable lens or a surface of the second tunable lens.

21. An optical system comprising:
    a virtual image content output device;
    a first tunable lens on a real-world side of the virtual image content output device;
    a second tunable lens on an eye side of the virtual image content output device;
    at least one compensating lens, wherein the at least one compensating lens is configured to substantially eliminate magnification changes of real-world light between a real-world end of the optical system and an eye-side end of the optical system as a focal power of at least one of the first tunable lens or the second tunable lens changes,
    wherein the at least one compensating lens is disposed at least one of:
        adjacent the first tunable lens opposite the virtual image content output device,
        between the first tunable lens and the virtual image content output device, or
        between the second tunable lens and the virtual image content output device.

* * * * *